Dec. 21, 1965 P. KUDRIAVETZ, JR 3,224,224
FLEXIBLE COUPLING

Filed June 7, 1963 2 Sheets-Sheet 1

INVENTOR.
PETER KUDRIAVETZ, JR.
BY
*Eyre, Mann & Lucas*
ATTORNEYS

Dec. 21, 1965  P. KUDRIAVETZ, JR  3,224,224
FLEXIBLE COUPLING

Filed June 7, 1963  2 Sheets-Sheet 2

INVENTOR.
PETER KUDRIAVETZ, JR.

BY

*Eyre, Mann & Lucas*
ATTORNEYS

United States Patent Office 3,224,224
Patented Dec. 21, 1965

3,224,224
FLEXIBLE COUPLING
Peter Kudriavetz, Jr., Marion, Mass., assignor to Acushnet Process Company, a corporation of Massachusetts
Filed June 7, 1963, Ser. No. 286,290
5 Claims. (Cl. 64—11)

The present invention relates to couplings and more particularly to couplings for transmitting power from one rotating shaft to another.

In many cases where power is transmitted from one shaft to another it is desirable, and sometimes necessary, that the two shafts be otherwise free to move with respect to each other. For example, where the two shafts move eccentrically with respect to each other or where the axes of the two shafts are misaligned such freedom of motion would be desirable since it would permit transmission of power from one shaft to the other without deleterious affects on bearings supporting the shafts, the prime mover driving the one shaft, or the load being driven by the other.

Therefore, it would be desirable to have an inexpensive coupling for transmitting power between two shafts which has sufficient torsional rigidity to transmit power between the two shafts and yet is flexible enough to allow the shafts to otherwise move freely with respect to each other. In accordance with the present invention, flexible loops are connected between the shafts to provide such a coupling. These loops will bend, flex and roll when the shafts change their positions or orientations with respect to each other and yet have sufficient torsional rigidity to transmit power.

Preferably, each coupling is made of two flexible loops which are attached together in tandem at right angles to each other and which are integrally formed of a flexible material such as natural or synthetic rubber, leather, impregnated cloth or plastic. With this arrangement, the coupling will permit the shafts to move in any direction with respect to each other and will have a certain amount of torsional flexibility and resilience to absorb the shocks of acceleration and deceleration of one of the shafts with respect to the other. Also, in this form, the coupling will distort to accommodate a large misalignment of the shafts without causing extreme wear of the bearings supporting the shafts.

For a better understanding of my invention and for other embodiments thereof, reference should be had to the accompanying drawings of four embodiments of the invention of which:

Figure 1:
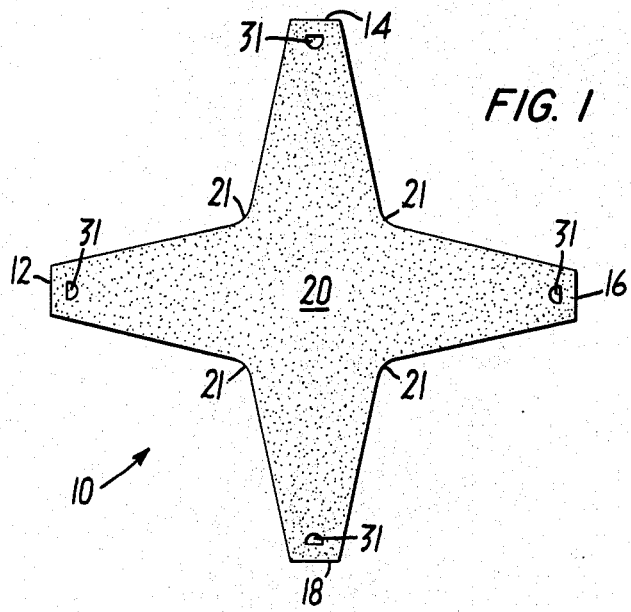
FIGURE 1 is a plan view of a flat cross-shaped piece of elastomeric material used to form a flexible coupling which constitutes the preferred embodiment of the present invention.
Figure 2:
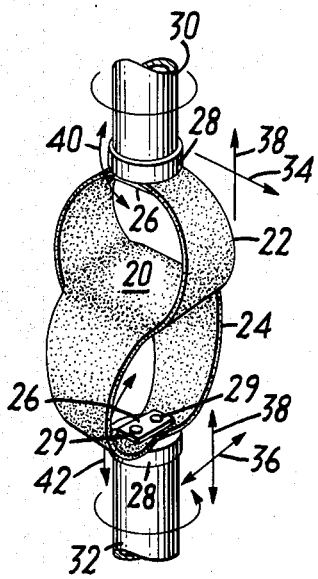
FIGURE 2 is a perspective view of the flexible coupling which constitutes the preferred embodiment of the present invention formed from the cross in FIGURE 1.

Referring to FIGURES 1 and 2, the flat, cross-shaped sheet of elastomeric material 10 of the preferred embodiment has four tapering arms 12, 14, 16 and 18 spaced 90° apart from each other around an integrally formed main body portion 20 having curved edges 21 between adjacent arms.

To form the flexible coupling from the cross-shaped sheet 10, arms 12 and 16 are bent and brought together at their ends on one side of the main body portion 20, and arms 14 and 18, are bent and brought together at their ends on the opposite side of the main body portion 20. This provides two flexible loops 22 and 24 which are then attached to caps 28 by metallic clamps 26 which have fasteners 29 extending into the caps 28 through holes 31 in the arms 12, 14, 16 and 18. These fasteners are keyed to the holes to limit the amount of movement between the ends of the arms and the caps.

The caps 28 are used to attach the coupling between two shafts by fitting one of the caps over the end of one of the shafts 30, say one driven by a motor, and attaching it thereto, and fitting the other of the caps over the end of the other shaft 32, say one powering a load, and likewise attaching it thereto.

With the coupling fixed to the shafts in this manner, power from the motor will be transmitted, through the loop 22, the main body portion 20, and the loop 24, to the shaft 32 and from there to the load. However, since it is torsionally flexible and resilient, the coupling will distort when subjected to torsional stresses caused by acceleration or deceleration of one of the shafts with respect to the other. Therefore, there will be a lag in the transmission of such accelerations and decelerations from one shaft to the other. In most cases this is desirable since it protects the motor from being jolted by the inertia of the load during rapid acceleration and deceleration of the motor and during periods when the load is being increased.

Aside from joining the shafts together for torsional transmission of power from one to the other, the coupling permits significant movements between the shafts 30 and 32 by permitting movement along the three orthogonally oriented axes defined by the three orthogonally oriented lines 34, 36 and 38 and by allowing changes in the angular oirentation of the shafts with respect to each other in any direction.

With respect to movement along the three orthogonally oriented axes, loop 22 permits movement along line 34 by rolling back and forth along that line when the shafts exert forces on the coupling with components parallel to line 34, and loop 24 permits movement along line 36, which is perpendicular to line 34, in like manner when the shafts exert forces on the coupling with components parallel to line 36. If there are forces exerted by the shafts with components at right angles to both lines 34 and 36, along lines 38, the loops will bend to permit motion in those directions.

As for the angular movements of the shafts with respect to each other, the loops 22 and 24 will twist as shown at 40 and 42, when the shafts pivot around their axes, to allow such movements.

Therefore, except for transmitting power torsionally from one to the other, the shafts are free to move with respect to each other within the physical limits of the coupling.

Figure 3:
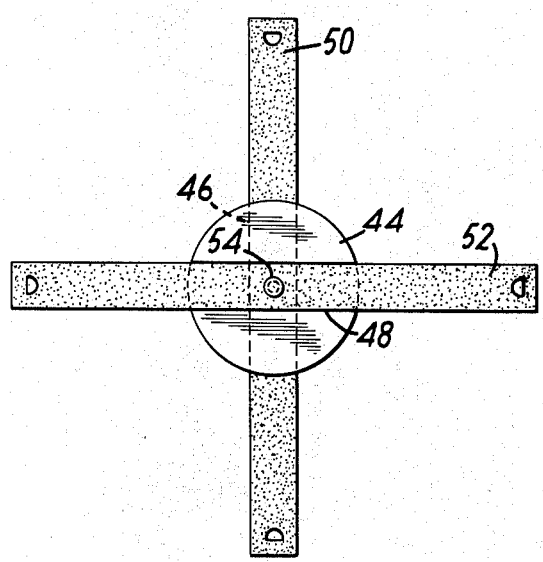
FIGURE 3 is a plan view of a cross-shaped metal member used to form a flexible coupling which constitutes a second embodiment of the present invention.

It should be apparent that the amount of flexibility, both torsional and otherwise, provided by the coupling may be changed as desired by varying the resiliency and thickness of the elastomeric sheet 10 of which the coupling is formed. It is also possible to change the flexibility by using other materials in forming the coupling. In fact, if so desired the coupling could be formed of a cross of metal as is shown in FIGURE 3. This cross has a metallic body portion 44, in the form of a disc with grooves 46 and 48 on opposite sides thereof, arranged at right angles to each other. The arms of the cross are strips 50 and 52 of spring steel, phosphur bronze, or other metal with a high modulus of elasticity, which are arranged in the grooves 46 and 48 and are fixed to the disc by a fastener 54 which passes through the disc and clasps the strips to the disc on either side thereof.

To form a flexible coupling from this metallic cross, the opposite ends of the two strips are brought together and attached to the shafts in the manner discussed above with respect to the preferred embodiment shown in FIGURES 1 and 2. Such a metallic coupling may be desired where very accurate transmission of variations in the velocity of rotation are wanted since, being formed of metal, the coupling would have very little torsional flexibility. However, in most situations, the embodiment of FIGURES 1 and 2 is preferable because the nature of its flexibility provides greater protection against overloading the motor driving the shaft and better compensates for misalignment and eccentric motions of the shafts.

Figure 4:
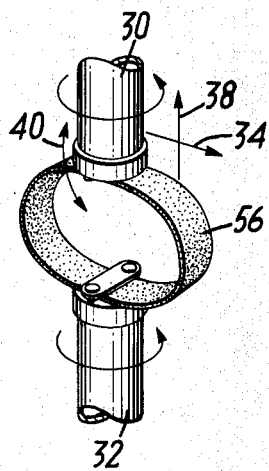
FIGURE 4 is a perspective view of a single loop coupling which constitutes a third embodiment of the present invention.

Another way in which the flexibility of the coupling may be changed is by changing the coupling's shape. For example, the loops 22 and 24 could be oriented at other than 90° to each other and thereby cut down movement of the shafts in the plane defined by lines 34 and 36. The ultimate change in orientation of the loops with respect to each other would be to arrange the two loops parallel to one another or, as shown in FIG. 4, to have only one continuous loop 56 of elastomeric material which is attached to shafts 30 and 32 at points diametrically arranged with respect to one another. This single loop embodiment when made sufficiently rigid to torsionally transmit power from one shaft to another will be far less flexible with respect to other movements of the shafts than the two embodiments shown in FIGURES 1 through 3 and for this reason, it cannot be used effectively where there is a significant misalignment of the axes of shafts or eccentric movements of the shafts. However, it may be used in certain cases where such misalignments and eccentric movements do not exist and where it is desirable to have some freedom of movement between the shafts.

Figure 5:
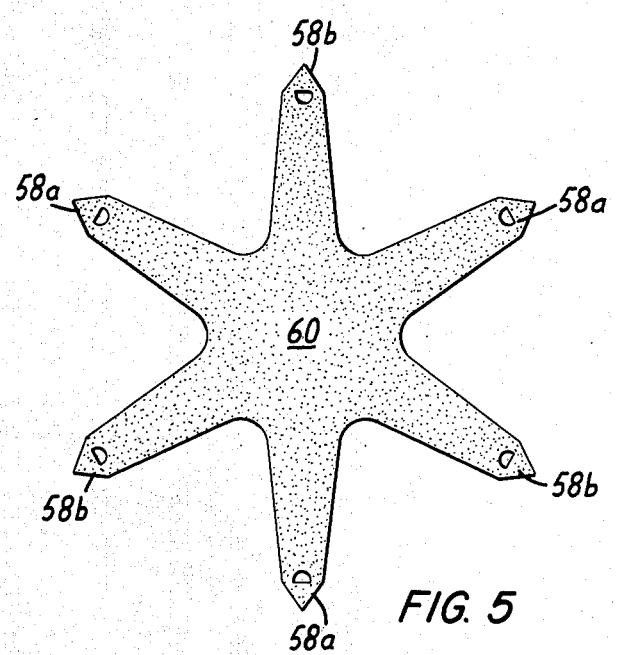
FIGURE 5 is a plan view of a piece of elastomeric material having six radially extending arms used to form a fourth embodiment of the present invention.
Figure 6:
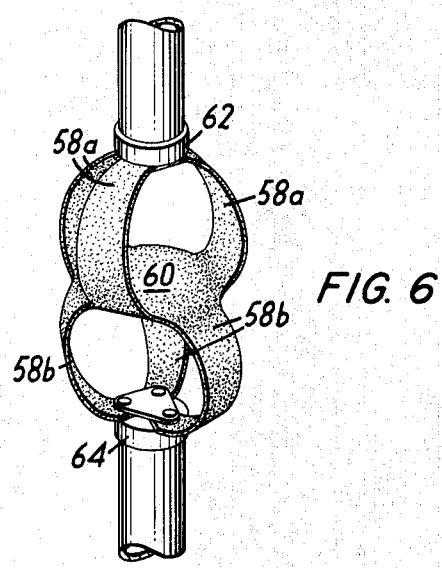
FIGURE 6 is a perspective view of the coupling formed of the piece of elastomeric material shown in FIGURE 5.

Another change in the shape of the coupling which effects the characteristics of the coupling is the addition of arms to the coupling. FIGURE 5 shows a elastomeric sheet with six radially extending arms 58 spaced at 60° intervals around the periphery of an integrally formed main body portion 60. To form the coupling from this elastomeric sheet alternate arms 58a are bent and brought together at their ends on one side of the main body portion and alternate arms 58b are bent and joined together at their ends on the other side of the main body portion to form the two looplike arrangements one on either side of the main body portion. As shown in FIG. 6, these looplike arrangements are then joined to caps 62, which fit over the ends of the shafts, by metallic clamps 64 which hold the ends of arms 58 in position on the cap in the same manner discussed in connection with the preferred embodiment. This coupling has more torsional rigidity and puts more restriction on the movements of the shafts with respect to each other. For this reason it is especially well adapted to uses where high powered motors and large loads are involved. Of course even more arms could be added if desired. For instance, the elastomeric piece could be formed with 8, 12 or even 16 arms if necessary.

Above I have discussed my invention and a number of embodiments thereof. It should be apparent that other embodiments are possible. Therefore, it will be understood that this is intended to cover all changes and modifications of the embodiments herein chosen for the purpose of illustration which do not constitute departures from the spirit and scope of the invention.

I claim:
1. A flexible coupling for two members spaced from each other which comprises, a member with a main body portion, and at least four flexible arms extending therefrom, at least two of said flexible arms being bent around on one side of said main body portion and affixed at their ends to one of said members, and at least two of said flexible arms being bent around on the second side of said main body portion and affixed at their ends to the second one of said members, the distance between interior surfaces of the two bent arms on each side of the main body portion being greater than the distance between the interior surfaces of such arms at the place where the arms are attached to the main body portion and affixed to the said members when measured in a plane at right angles to the common axis of both members when held in perfect alignment said body portion and said arms forming a pair of flexible loops substantially circular in cross section.

2. A structure as specified in claim 1 in which the said bent arms are positioned at ninety degrees to each other.

3. A flexible coupling for joining two rotatable members which are spaced from each other which comprises, at least two nonmetallic flexible arms joined in tandem, each one of said flexible arms being bent around on opposite sides of said tandem junction and affixed to one of said members, the distance between interior surfaces of the bent arm on each side of said tandem junction being greater than the distance between interior surfaces of such arm at the tandem junction and place where the arm is affixed to the said member when measured in a plane at right angles to the common axis of both members when held in perfect alignment said arms being torsionally flexible and resilient to permit relative twist between the members as in the transmission of rotation during acceleration and deceleration for absorbing shock incident thereto.

4. A structure as specified in claim 3 in which the said two arms are integrally formed of a flexible material.

5. A flexible coupling for joining two members spaced from each other which comprises a member with a main body portion, and at least four nonmetallic flexible arms extending therefrom, at least two of said flexible arms being bent around on one side of said main body portion and affixed to one of said members, and at least two of said flexible arms being bent around on the second side of said main body portion and affixed to the second one of said members, the distance between interior surfaces of the two bent arms on each side of the main body portion being greater than the distance between the interior surfaces of such arms at the place where the arms are attached to the main body portion and affixed to the said members when measured in a plane at right angles to the common axis of both members when held in perfect alignment, said arms being torsionally flexible and resilient to permit relative twist between the members as in the transmission of rotation during acceleration and deceleration for absorbing shock incident thereto.

References Cited by the Examiner
UNITED STATES PATENTS 2,591,769    4/1952    Beechler.
2,860,495   11/1958    Stark _____ 64—11

FOREIGN PATENTS 344,074    8/1904    France.
853,804   12/1939    France.
861,600    2/1961    Great Britain.

MILTON KAUFMAN, *Primary Examiner.*

ROBERT C. RIORDON, *Examiner.*